United States Patent Office 3,408,871
Patented Nov. 5, 1968

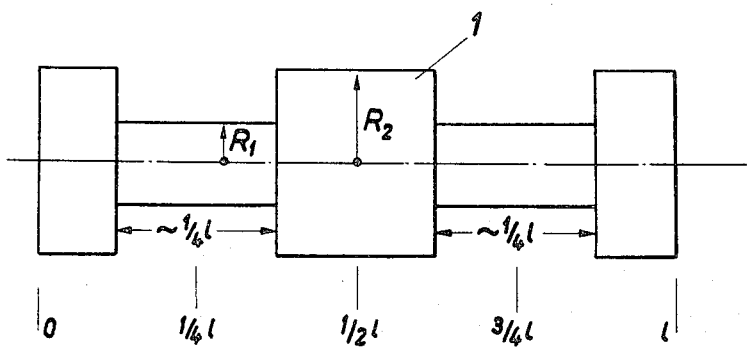
FIG.2
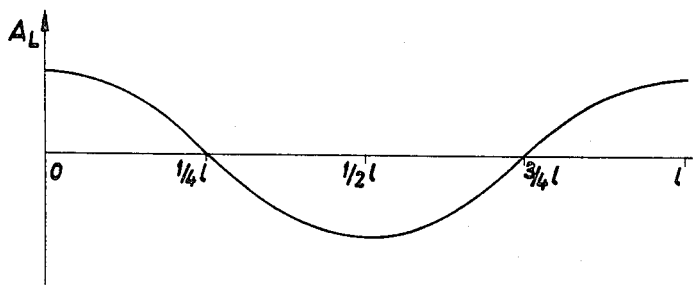
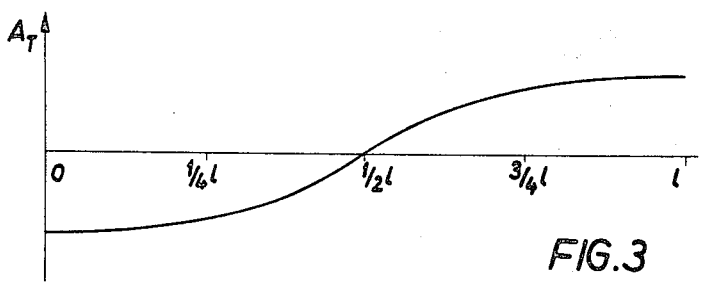
FIG.3

3,408,871
TRANSDUCER FOR ANGULAR MOTION
Manfred Börner, Ulm (Danube), Germany, assignor to Telefunken Patentverwertungsgesellschaft m.b.H., Ulm (Danube), Germany
Filed June 28, 1965, Ser. No. 467,392
Claims priority, application Germany, June 27, 1964, T 26,464; Mar. 5, 1965, T 28,109
10 Claims. (Cl. 73—505)

ABSTRACT OF THE DISCLOSURE

A device for measuring angular velocities by means of a resonant system whose moment of inertia with respect to an axis of rotation is periodically variable with respect to an axis of rotation in order to obtain torsional oscillations within the system in dependence upon a rotation about the axis of rotation. The system includes a symmetrical resonator excitable to longitudinal oscillations of the $n\lambda$ resonance in the direction of the axis of rotation. The symmetrical resonator is so constructed that the $n\lambda/2$ resonance of the torsional oscillation of the resonator is near the resonant frequency of the longitudinal oscillations. The $n$ above is equal to 1, 2, 3, etc., and $\lambda$ is the wavelength of a certain frequency within the oscillating body.

---

The present invention relates generally to the transducer art, and, more particularly, to a device for measuring angular velocities which includes a resonant system having a moment of inertia with respect to an axis of rotation which is periodically variable by means of external electromechanical excitation for obtaining torsional oscillations within the resonant system in dependence upon rotation about the axis of rotation.

Such devices are used, for example, in the control and steering systems of manned and unmanned crafts. They can be used for the representation of an artificial horizon in airplanes or generally can be used to create a fixed reference coordinate system for freely movable flying objects such as aircraft.

In my co-pending application Ser. No. 340,243, filed Jan. 27, 1964, now Patent No. 3,304,785 and entitled Transducer, there is disclosed an apparatus for measuring angular velocities and having an oscillating system which can oscillate at substantially high frequencies because of its mechanical structure. Externally effective shocks can only be a detrimental influence upon the measuring operation when such shocks have such high frequency components that they fall within the range of the frequency used in the measuring system. Thus, the oscillating system is so shaped that it can very easily be arranged to be an extremely symmetric structure.

The apparatus for measuring angular velocities according to the aforementioned patent application is provided with a symmetrical resonator which is the most essential component of the resonant system. This symmetrical resonator can be excited to longitudinal oscillations in the direction of its axis of rotation of the $n\lambda/2$ resonance. The resonator is so constructed that the $n\lambda$ resonance of the torsional oscillation of the resonator is also at least near the resonant frequency of the longitudinal oscillations, where $n$ is equal to 1, 2, 3, etc., and where $\lambda$ (lambda) is the wavelength of a certain frequency within the oscillatory body or resonator. The wavelength is dependent on the material from which the oscillatory body is made or from the speed of sound within such material and from the form of oscillation the body undergoes, thus $\lambda/2$ resonance indicates that the length of the oscillatory body is equal to $\lambda/2$. The definitions here set forth remains the same throughout the remaining portions of the text.

However, one of the disadvantages of such a device is that the entire rotational energy is not coupled in with the torsional oscillations. Rather, on the basis of the law of the conservation of angular momentum, the resonant body is periodically rotated in its entirety by a portion of the energy of inertia. This constant periodic basic rotation, which does not change locally along the resonant body, represents lost energy for the measuring operation because the sensitivity of the device is substantially determined by the gyromechanical coupling producing resonance.

With this in mind, it is a main object of the present invention to provide a device for measuring angular velocities which does not have the above-mentioned disadvantages.

It is another object of the present invention to provide a device of the character described which is relatively simple in construction.

These objects and others ancillary thereto are accomplished in accordance with preferred embodiments of the invention wherein the most important component of a resonant system is a symmetrical resonator which is excited to longitudinal oscillations of the $n\lambda$ resonance in the direction of its axis of rotation. The resonator is so constructed that at least in the proximity of the resonant frequency of the longitudinal oscillations, there is also the $n\lambda/2$ resonance of the torsional oscillation of the resonator, where $n$ has the numerical values 1, 2, 3 . . . ($n/1$ being the preferred value with the greatest effect) and $\lambda$ (lambda) being the wavelength of a certain frequency within the resonator as defined above.

It is particularly advantageous to excite the resonator to longitudinal oscillations having a frequency corresponding to the $\lambda$ resonance and within the resonator having such a shape that when it rotates about an axis in the direction of its longitudinal oscillation, it oscillates torsionally with the torsional oscillations being of the same frequency but at the $\lambda/2$ resonance.

In the apparatus disclosed in my above-mentioned co-pending application, there is an interaction between a $\lambda/2$ longitudinal oscillation and a $\lambda$ torsional oscillation. In contradistinction to this, the device of the present invention avoids the disadvantages of a basic rotation by an interaction between a $\lambda$ longitudinal oscillation and a $\lambda/2$ torsional oscillation which is tuned to the same frequency by using certain measures.

Additional objects and advantages of the present invention will become apparent upon consideration of the following description when taken in conjunction with the accompanying drawings in which:

FIGURE 2 is an enlarged elevational view of a resonator constructed in accordance with the present invention.

FIGURE 3 illustrates two plots of the amplitudes of the longitudinal oscillation and of the torsional oscillaion, respectively, along the resonator.

Figure 1:
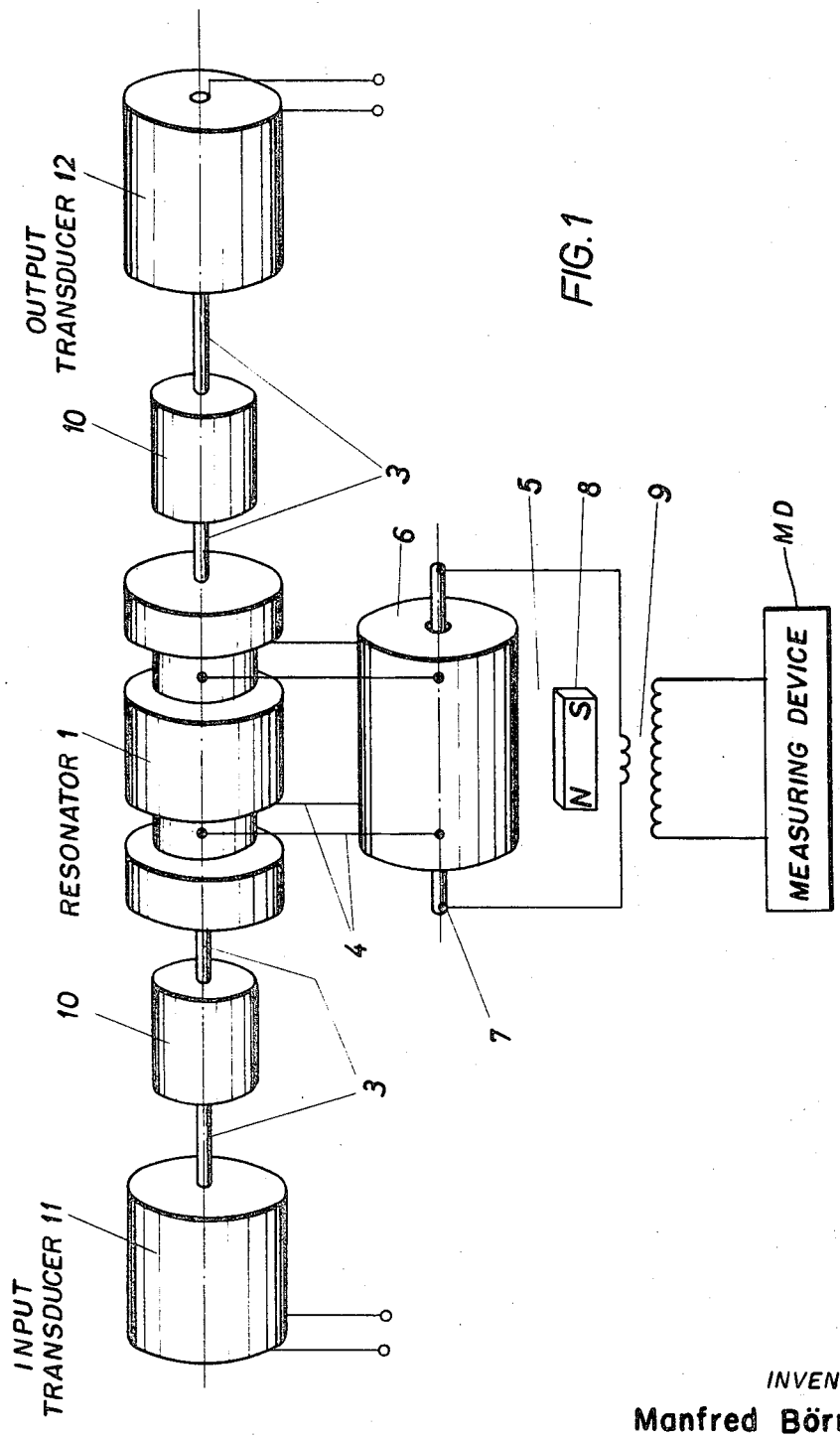
FIGURE 1 is a diagrammatic perspective view of one embodiment of the present invention.

With more particular reference to the drawings, FIGURE 1 illustrates the resonant system of the present invention. It includes the resonator 1 which is provided with notches or circumferential grooves. This resonator is slightly or weakly coupled to the input transducer 11 via coupling elements 3 and 10, and is similarly coupled to the output transducer 12. As has already been described in my above-mentioned co-pending patent application, a high frequency generator can be used to produce the longitudinal oscillations in resonator 1 and this generator applies its alternating voltage to transducer 11. However, it is particularly advantageous if the resonant system is excited to natural oscillations with the aid of a feedback connection from the output transducer 12 to the input transducer 11 via an amplifier network, as, for example, is shown in FIGURE 3 of my copending application.

The torsional oscillations produced upon rotation of the resonator 1 are converted into electrical oscillations by a torsional transducer 5. This torsionally oscillating magnetostrictive transducer 5 includes a magnetostrictive cylindrical oscillator 6, a permanent magnet 8, and a ring core coil comprising a single massively constructed winding 7 which, at the same time, serves for mounting the magnestostrictive cylindrical oscillator. Since the voltage emitted by the torsionally oscillating magnestostrictive transducer 5 is very small and low-ohmic, the alternating voltage produced in the ring core coil is customarily first applied to a matching transformer 9 and then to the measuring device MD.

Transducer 5 is coupled to resonator 1 by means of longitudinally oscillating coupling lines 4, which, in the illustrated embodiment, are fastened to points on the surface of the resonator 1 at which points the longitudinal oscillation is a minimum. These points are at the resonator 1 within the grooves along the nodal plane of the λ longitudinal direction and λ (lambda) being the wavelength of a certain frequency within the resonator as previously defined.

With more particular reference to FIGURE 2, the resonator 1 is illustrated. It includes a cylindrical body having a length $l$. This body is provided with reductions in its cross section from radius $R_2$ to radius $R_1$ at the nodal points of the longitudinal oscillation. The purpose of this is for tuning the λ longitudinal resonance to the frequency of the λ/2 torsional resonance of the resonant body.

FIGURE 3 shows, in the upper plot, the amplitude curve of the longitudinal oscillation $A_L$ and in the lower plot of the torsional oscillation $A_T$ along the resonant body 1. In the case of a longitudinal sound velocity of $V_L \simeq 5.0 \cdot 10^5$ cm./sec. and a torsional sound velocity of $V_T \simeq 2.8 \cdot 10^5$ cm./sec., then the following corresponding frequencies result for a resonant body having a length $l = 5$ cm:

$f_L \simeq 100$ kcs.
$f_T \simeq 28$ kcs.

In order to carry out a tuning of the frequency of the λ longitudinal resonance to the frequency of the λ/2 torsional resonance, a reduction in the cross section of $R_1/R_2 \simeq \frac{1}{4}$ is necessary.

Figure 4:
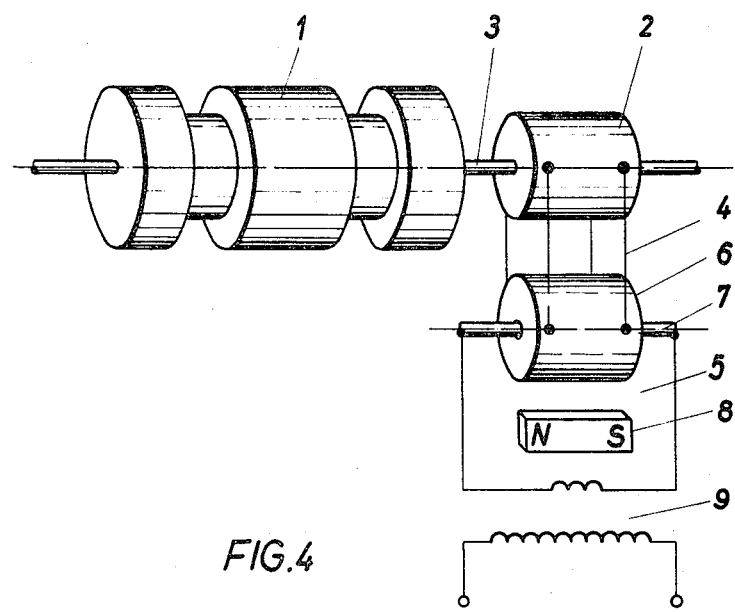
FIGURE 4 is a diagrammatic perspective view of a portion of another embodiment of the invention.

FIGURE 4 illustrates an embodiment of a device which is constructed in accordance with the invention and wherein the decoupling of the torsional oscillations is not directly performed but rather is accomplished by means of an additional torsional resonator. The resonator 1 which can be excited to longitudinal oscillations is connected with the torsional resonator 2 by means of a coupling line 3. These three elements which are in rotation symmetry can be very precisely manufactured. The necessary transducers for exiting longitudinal oscillations in the resonator 1 are not shown in FIGURE 4. There is damping of the longitudinal oscillations of the resonator 2. These longitudinal oscillations occur at frequencies which deviate or are other than the torsional frequency (for example, the latter might be 100 kcs.). These deviating frequencies are for example 60 kcs, 120 kcs., etc., and the resonator 2 does not have longitudinal oscillations. The torsional transducer 5 is connected with the torsional resonator 2 by means of coupling lines 4 and therefore is sensitive only for torsional oscillations. The torsional transducer 5 corresponds in its construction to the torsional transducer 5 shown in FIGURE 1.

In order to provide still further decoupling of the torsional oscillations from the longitudinal oscillations, it is also possible to provide further torsional resonators between the resonator 1 and the torsional resonator 2 which is coupled with the torsional transducer 5. However, it is important that the theoretically greater symmetry of the vibration structure for the torsional oscillation derivation obtained by inserting one or more torsional resonators as compared to the direct derivation of oscillations from resonator 1 is guaranteed by accuracy in the machining process.

The bandwidth of the torsional filter used for decoupling and which comprises the resonators 1 and 2, the coupling lines 3 and 4, as well as the transducer 5, is given by the fourth power of the relationship of the diameters of the coupling line 3 and the torsional resonator 2. If only very slow rotational speed variations are to be determined, the bandwidth can be reduced to a few cycles. However, when measuring rapid variations in rotational speed, this bandwidth must be maintained larger.

It can thus be seen that preferred embodiments of the present invention have been provided. What has proved to be advantageous is the construction of a resonator of cylindrical configuration having annular notches or grooves for the purpose of tuning the $n\lambda$ longitudinal resonance to the frequency of the $n\ \lambda/2$ torsional resonance of the resonance body at the nodal planes of the longitudinal oscillation.

The entire resonant system includes such a resonator and also an input transducer and an output transducer which are excitable to longitudinal oscillations by means of an alternating voltage. The input and output transducers are weakly coupled with the resonator. A torsional transducer is provided from which a voltage proportional to the torsional oscillation of the resonator can be derived.

A torsional transducer particularly suited for the present invention is a magnetostrictive cylindrical resonator, and a ring core coil which includes a single massively constructed winding which serves as a support for the magnetostrictive cylindrical oscillator.

The coupling of the torsional transducer can be accomplished by means of coupling elements connected directly at those points on the surface of the resonator where the longitudinal oscillation is a minimum. However, there is a disadvantage of deriving the torsional oscillations in this manner. The reason for this is that because of a residual unbalance which is not completely controllable, it can easily happen that energy will be directly transmitted from the longitudinal motion of the resonator which can be excited to longitudinal oscillations to the torsional transducer, and this can lead to an error. Therefore, as a further feature of the invention, at least one additional symmetrical torsional resonator is provided which extends with its longitudinal axis along the axis of rotation of the resonant system. Such a torsional resonator is on the one hand connected with the resonator which can be excited to longitudinal oscillations by means of at least one coupling element and, on the other hand, with the torsional transducer by means of at least one coupling element. Such a torsional resonator is preferably constructed to be an $n\lambda/2$ resonator ($n = 1, 2, 3 \ldots$) while the coupling element between the torsional resonator and the torsional transducer preferably has a length of λ/4 of the torsional resonance.

In a practical embodiment a resonator 1, as shown in FIGURE 2, had a length of 5 cm., the end parts were each 0.625 cm. long, and the three sections between were each 1.25 cm. long. The bigger radius $R_2$ was 0.6 cm. and the smaller one $R_1$ 0.15 cm. The whole resonator was made of aluminium. The operating frequency was 28 kcs.

It will be understood that the above description of the present invention is susceptible to various modifications, changes and adaptations, and the same are intended to be comprehended within the meaning and range of equivalents of the appended claims.

What is claimed is:

1. In a device for measuring angular velocities including a resonant system whose moment of inertia with respect to an axis of rotation is periodically variable by means of external electromechanical excitation for producing torsional oscillations within the resonant system in dependence upon rotation about the axis of rotation, the improvement wherein a symmetrical resonator excitable to longitudinal oscillations of the $n\lambda$ resonance in the direction of the axis of rotation is the most essential part of the resonant system, said resonator being constructed so that the $n\lambda/2$ resonance of the torsional oscillation of the resonator is also at least near the resonant frequency of the longitudinal oscillations, where $n$ is equal to 1, 2, 3, etc., and $\lambda$ is the wavelength of a certain frequency within the resonator.

2. The improvement defined in claim 1 comprising means for exciting the resonator to longitudinal oscillations of the $\lambda$ resonance so that torsional oscillations of the $\lambda/2$ resonance are carried out upon rotation about an axis in the direction of the longitudinal oscillation.

3. The improvement defined in claim 1 wherein said resonator is of cylindrical shape and is provided with means in the form of annular grooves for matching the $n\lambda$ longitudinal resonance with the frequency of the $n\lambda/2$ torsional resonance of the resonator, said grooves being located at the place of at least one of the nodal planes of the longitudinal oscillation.

4. The improvement defined in claim 2 wherein said means includes an input transducer connected to said resonator and an output transducer connected to said resonator, said transducers being excitable to longiutdinal oscillations by means of alternating voltages, said transducers being weakly coupled with the resonator, and further comprising a torsional transducer from which a voltage can be derived which is proportional to the torsional oscillation of the resonator.

5. The improvement defined in claim 4 wherein said torsional transducer includes a magnetostrictive cylindrical oscillator, a permanent magnet for polarizing said oscillator, and a ring core winding which is a single massive winding for mounting said oscillator.

6. The improvement defined in claim 4 comprising coupling elements for connecting the torsion transducer with the resonator, said coupling elements being mounted to points along the surface of the resonator at which the longitudinal oscillations are at a minimum.

7. The improvement defined in claim 4 further comprising at least one additional symmetrical torsional resonator arranged to have its longitudinal axis in the rotational axis of the resonant system, at least one coupling element connecting the torsional resonator with the resonator excitable to the longitudinal oscillations and at least one further coupling element connecting said resonator with the torsional transducer.

8. The improvement defined in claim 7 wherein the torsional transducer is constructed to be an $n\lambda/2$ resonator.

9. The improvement as defined in claim 7 wherein the coupling element between the torsional resonator and the torsional transducer has a length of $\lambda/4$ of the torsional resonance.

10. A device for measuring angular velocities, comprising, in combination:
(a) a resonant system whose moment of inertia with respect to an axis of rotation is periodically variable by external electromechanical excitation for producing torsional oscillations within the resonant system in dependence upon rotation about the axis of rotation, said resonant system including as the most essential part a symmetrical resonator excitable to longitudinal oscillations of the $n\lambda$ resonance in the direction of the axis of rotation, said resonator being constructed so that that $n\lambda/2$ resonance of the torsional oscillation of the resonator is also at least near the resonant frequency of the longitudinal oscillations, where $n$ is equal to 1, 2, 3, etc., and $\lambda$ is the wavelength of a certain frequency within the resonator;
(b) means for exciting the resonator to longitudinal oscillations of the $\lambda$ resonance so that torsional oscillations of the $\lambda/2$ resonance are carried out upon rotation about an axis in the direction of the longitudinal oscillation; and
(c) transducer means for coupling only the torsional oscillations from said resonator.

References Cited
UNITED STATES PATENTS

| 2,683,247 | 7/1954 | Wiley | 73—505 XR |
| 3,182,512 | 5/1965 | Jones et al. | 73—505 |
| 3,241,377 | 3/1966 | Newton. | |
| 3,307,409 | 3/1967 | Newton | 73—505 |

JAMES J. GILL, *Primary Examiner.*